United States Patent [19]

Pelloso et al.

[11] 4,316,919

[45] Feb. 23, 1982

[54] SUNFLOWER-OIL-BASED EDIBLE FAT PRODUCT

[75] Inventors: Turiddu A. Pelloso, Danbury; Lawrence Kogan, Stamford, both of Conn.

[73] Assignee: Nabisco Brands, Inc., New York, N.Y.

[21] Appl. No.: 188,656

[22] Filed: Sep. 19, 1980

[51] Int. Cl.$^3$ .......................... A23D 3/02; A23D 5/00
[52] U.S. Cl. ...................... 426/603; 426/607
[58] Field of Search ............... 426/601, 603, 606, 607; 260/410.7

[56] References Cited

U.S. PATENT DOCUMENTS

| | | | |
|---|---|---|---|
| 2,955,039 | 10/1960 | Melnick et al. | 426/607 X |
| 3,796,581 | 3/1974 | Frommhold | 426/601 |
| 3,956,522 | 5/1976 | Kattenberg et al. | 426/607 X |
| 4,045,588 | 8/1977 | Wieske | 426/607 |
| 4,230,737 | 10/1980 | Heider et al. | 426/607 |

*Primary Examiner*—Robert A. Yoncoskie
*Attorney, Agent, or Firm*—Richard Kornutik

[57] ABSTRACT

A sunflower-oil-based edible fat blend suitable for preparing a margarine having a pleasing texture and a high linoleic acid content are disclosed. The edible fat blend comprises at least one randomly interesterified portion and a non-interesterified portion. An essential interesterified portion, requires the inclusion of at least 30% hydrogenated sunflower oil, while the non-interesterified portion requires at least 60% liquid sunflower oil containing at least 65% linoleic acid. Optionally, a third portion can be employed which will consists essentially of randomly interesterified liquid sunflower oil. The edible fat product will contain less than 21% total of palmitic and stearic acids and from 32 to 55% linoleic acid. Both tub and stick margarines prepared from the edible fat product are disclosed.

13 Claims, No Drawings

SUNFLOWER-OIL-BASED EDIBLE FAT PRODUCT

BACKGROUND OF THE INVENTION

The present invention relates to edible fat blends suitable for preparing edible fat products, such as margarines, and in its preferred aspects, to stick and tub margarines prepared from sunflower oil.

Sunflower oil is high in polyunsaturates, principally linoleic acid, and relatively low in saturated fatty acids. The art has therefore endeavored to prepare margarine from it. However, the preparation of margarine from liquid oils such as sunflower oil is a complex matter.

Margarines for home table use have been produced by preparing partially hydrogenated liquid oils or blends of liquid vegetable oils with hydrogenated hardstock and emulsifying the blends with suitable aqueous phase compositions to prepare a water-in-oil emulsion. The amount and character of the hardstock have been varied depending on the consistency of product desired. To be acceptable, a margarine product must have certain flow characteristics while resisting free oil separation and yet should rapidly melt on the tongue. In the past, when it was attempted to prepare margarine based entirely on sunflower oil by blending liquid oil with a hydrogenated hardstock, the quality of the margarine diminished with time as fat recrystallization or graininess set in, resulting in a sandy texture.

The texture problem of sunflower oil margarines was discussed by Freier et al in *Industria Alimentara*, Vol. 24, no. 11, November 1973, at pages 604-607. The title of the Freier et al article translates to "The Transesterification of the Sunflower Seed oil—A Method for Improving the Quality of Margarine". According to the authors, margarines made exclusively of sunflower oil undergo polymorphic changes and recrystallizations in the oil phase which modify the textural properties of the margarine. Some samples become "floury" after 10 days and "sandy" after 20 days when subjected to temperature cycling. However, where from 40 to 50% of the oil phase of the margarines were transesterified binary or ternary mixtures of liquid and hydrogenated sunflower oils, the sandy texture was not noticed for periods of 30 days or more. These margarines had linoleic acid contents up to about 36% as measured by gas chromatography. The successful margarine products (samples M-3, 4, 7 and 8) also contained a non-transesterified portion, half of which was hydrogenated sunflower oil.

The problem of recrystallization was earlier identified by Gander et al in Belgian Pat. No. 670,371. Also related to this disclosure are DAS (Deutsches Auslegeschrift) No. 1,299,992 and Netherlands Pat. No. 149,686. In the Belgian patent, Gander et al disclose that margarines based on blends of hydrogenated and unhydrogenated sunflower seed oil, undergo recrystallization of the solid fat to the stable beta-modification. The resulting margarine is said to become hard and crisp on one hand, and gritty and mealy on the other. During melting in the mouth, an unpleasant sensation is caused. Example 2 of this patent shows a margarine prepared with a blend of 40% liquid sunflower oil, 40% sunflower oil hydrogenated to a melting point of 33° C., and 20% sunflower oil hydrogenated to 42° C. This product was unsuccessful in terms of texture. The patent also shows in Example 4 that a margarine prepared with an interesterified blend of sunflower oils, 40% liquid and 60% hydrogenated to 33° C., is too soft. Successful margarines having 25.2% linoleic and 20.5% linoleic acid were prepared from blends which contained 80% of a transesterified mixture of liquid and hydrogenated sunflower oil and 20% of either all-liquid or liquid-plus-hydrogenated sunflower oils.

A later disclosure, found in U.S. Pat. Nos. 3,748,348 and 3,859,447, to Sreenivasan, states that directed interesterification can be employed to prepare a sunflower oil margarine without any hydrogenation. However, the directed process requires the use of an aprotic solvent and takes several days to complete. Other recent disclosures, such as U.S. Pat. No. 3,855,254 to Haighton et al, indicate that the directed interesterification of sunflower oil can be more rapidly carried out; however, the cycling of the temperature at 1° to 15° C. below the cloud point requires considerable care, investment in equipment, and energy.

SUMMARY OF THE INVENTION

It is an object of the present invention to provide both a sunflower-oil-based edible fat product having a linoleic acid content of greater than 32%, and a method for preparing it.

It is another object of the present invention to provide both a sunflower oil margarine having a desirable texture and a linoleic acid content of greater than 32%, and a method for preparing it.

It is a further object of the invention to provide both a sunflower oil tub margarine having a linoleic acid content of greater than 40%, and a method for preparing it.

It is a yet further object of the invention to provide both a sunflower oil stick margarine which has a linoleic acid content of greater than 32%, and a method for preparing it.

It is still another object of the invention to provide sunflower-oil-based edible fat products and methods for producing them wherein the products exhibit a reduced tendency to become grainy upon storage despite the presence of linoleic acid at levels of at least 32%, and preferably above 40%.

These and other objects are achieved according to the present invention. In its broad aspects, the sunflower-oil-based edible fat product according to the invention comprises a fat blend comprising: (a) from 30 to 75% by weight of the blend of a randomly interesterified first portion comprising from 30 to 100% hydrogenated sunflower oil, and from 0 to 70% liquid sunflower oil, both based on the weight of the first portion; and (b) from 25 to 70% by weight of the blend of a second portion comprising from 60 to 100% liquid sunflower oil, containing at least 65% linoleic acid, and up to 40% hydrogenated sunflower oil based on the weight of the portion; wherein the blend contains, based on its total weight, less than 21% total palmitic and stearic acids, and from 32 to 55% linoleic acid. According to a preferred embodiment, a margarine is provided comprising an aqueous phase, and an oil phase which consists essentially of the edible fat blend according to the invention.

The process for preparing the edible fat product of the invention, in its broad aspects, comprises: (a) randomly interesterifying a first oil portion comprising from 30 to 100% hydrogenated sunflower oil and from 0 to 70% liquid sunflower oil, both based on the weight of the first portion; and (b) blending said first oil portion with a second oil portion to form a fat blend, said second oil portion comprising from 60 to 100%, by weight of the portion, liquid sunflower oil containing at least 65% linoleic acid, and up to 40% hydrogenated sunflower oil based on the weight of the portion, the first oil portion comprising from 30 to 75% of the weight of the blend and the second oil portion comprising from 25 to 70% of the weight of the blend.

DETAILED DESCRIPTION OF THE INVENTION

The invention relates to sunflower-oil-based edible fat products and sunflower oil margarines in both the tub and stick forms. The products have high linoleic acid contents and obtain improved texture by randomly interesterifying a portion of the sunflower oil. The interesterification reaction randomizes the distribution of fatty acid moieties on the affected triglycerides. While not wishing to be bound to an exact theory of operation, it is believed that this randomization reduces the tendency of the higher melting point triglycerides from forming well-ordered, highly-stable crystals. By decreasing this tendency, it is believed that the rate of growth of these crystals, which would otherwise rapidly form a grainy texture, is reduced to maintain a desired texture for reasonable periods of storage.

The tendency toward graininess for products of this invention is measured by an objective test wherein the product is subjected to a defined procedure and then tasted for any organoleptic perception on the human tongue of the tactile effect of crystal formation. The degree of graininess is not measured. What is measured is the number of cycles of testing which the product can be subjected to without showing graininess. The sample is stored for at least 2 weeks at refrigerator temperature (40° F.), prior to commencing test. The sample is removed from refrigerator and tasted for graininess by mouthfeel. The sample is allowed to remain at room temperature for 8 hours and then is replaced in the refrigerator. After overnight refrigeration it is again removed and tasted for graininess by mouthfeel and remains at room temperature for 8 hours and is then refrigerated again. The 8 hours at room temperature, refrigeration and tasting cycle is repeated until graininess is observed. Samples placed in refrigeration on a Friday afternoon may remain until the following Monday morning. Acceptable products according to the invention decrease the tendency toward graininess. Preferred products will remain free from graininess for at least 5 cycles, and most preferably at least 10 cycles.

By the terms "sunflower-oil-based edible fat product" and "sunflower oil margarine" we mean products wherein all of the structural fat phase—that is all fat other than minor components such as emulsifiers, colors, flavors, vitamins, stabilizers, antispatter ingredients, crystal modifiers, and the like—is exclusively from sunflower oil. Thus, it can be said that the oil phase of margarines, low-fat spreads and other sunflower-oil-based edible fat products, consists essentially of sunflower oil. As will be explained in more detail, some of this can be hydrogenated, some will be unhydrogenated, and some will be interesterified.

The edible fat products of this invention can be in the form of the fat blend itself, or it can be blended to form margarine, low-fat spreads, and imitations or substitutes for margarine and butter. The composition of margarine is defined by governmental regulation and broadly comprises a water-in-oil emulsion containing at least 80% by weight of the oil phase. The low-fat spreads can contain the same ingredients as margarine, if desired, but have fat contents less than 80%. The form of the emulsion can be oil-in-water if desired. The margarine and butter substitutes can be of virtually any fat content and emulsion type. The following description will describe the production of a sunflower oil margarine, which is presently considered the best mode of the invention.

Margarines for home use are generally sold as one of two principal types, namely, print, hard or stick margarine and soft or tub margarine. Hard or stick margarine has a firmness consistent with a penetration range of 50 to 150 being in units of 0.1 mm. The penetration values are obtained by ANSI/ASTM method D217-68. Specifically, a standard penetrometer cone, having a 2.5" diameter and a 45° angle with 47.5 grams added weight at a 5-second interval at 40° F. are employed. Soft or tub margarine would have a firmness consistent with a penetration range of 100 to 250. Lesser amounts of margarine are sold in a form so soft that it is fluid, being at least capable of being squeezed from a flexible container. The present invention can be employed to prepare this type of product, but is preferably directed to the production of margarine in both soft form which is typically packaged in plastic tubs and in the hard form which is suitable for printing into sticks or forming into pats.

The texture of the sunflower oil edible fat blend, which forms the oil phase of the margarine, is defined at various temperatures by the solid fat index. The solid fat index (SFI) relates to the proportion of solid triglycerides in the oil as measured under specified conditions. It is calculated from dilatometer measurements as described in AOCS tentative method Cd 10-57.

The SFI values required for an oil phase to be used in a stick margarine are a minimum solids content of 15% at 50° F., a minimum solids content of 7% at 70° F. and a maximum solids content of 4%, preferably less than 3% at 92° F. Most preferably, the maximum solids content at 92° F. will be about 2%. At this specification, the margarine may be formed and wrapped satisfactorily, maintaining the stick form without substantial oil separation at room temperature and yet remains rapid melting on the tongue at about 96° F. A more preferred SFI profile will show solid contents within the following ranges:

| Temperatures | Solids (%) |
| --- | --- |
| 50° F. | 16 to 31 |
| 70° F. | 11 to 18 |
| 92° F. | 3.5 maximum |

Desirably, the stick margarine should remain firm at ordinary room temperature up to about 80° F., and will therefore most preferably have an SFI value at this temperature within the range of from about 8 to about 10%.

The SFI solids values required for an oil phase to be used in formulating a tub margarine are a minimum solids content of 8% at 50° F., and a minimum solids content of 3% at 70° F. and a maximum solids content of 4% at 92° F. Preferably, the SFI profile shows solids contents in the following ranges:

| Temperature | Solids (%) |
| --- | --- |
| 50° F. | 9 to 15 |
| 70° F. | 5 to 10 |

| Temperature | Solids (%) |
| --- | --- |
| 92° F. | 3.5 maximum |

While it is desired to obtain the highest levels of linoleic acid possible for both the soft and stick margarines, the stick margarine will require a higher level of solids and a correspondingly lower level of linoleic acid. All of the products according to the present invention will contain at least 32% linoleic acid (9,12-octadecadienoic acid) but will be limited to a practical maximum of about 55% due to the requirement for sufficient solids. The linoleic acid content values referred to herein are determined as cis, cismethylene-interrupted polyunsaturated fatty acids according to the Canadian Food and Drug Directorate Method FA-59. This method detects both linoleic and linolenic acids; however, because the amount of linolenic is so minor, the total polyunsaturate content is referred to herein as linoleic acid.

The edible fat product according to the present invention will be blended from at least two basic portions: a first portion which has been randomly interesterified, and a second portion which has not been interesterified and contains the major portion of the high linoleic acid content sunflower oil. The first oil portion will comprise from 30 to 100% hydrogenated sunflower oil and from 0 to 70% liquid sunflower oil, both of these percentages being based upon the weight of the first portion. The hardened portion of the sunflower oil will have a iodine value of less than 85. A portion, up to about 2%, of the hydrogenated sunflower oil can be fully hydrogenated to an iodine value of less than about 2. The sunflower oil can be hydrogenated according to known technology, for example as described in Bailey's Industrial Oil and Fat Products, 4th edition, 1979. In an optional feature, the edible fat product can include up to 30% by weight of a randomly interesterified third portion which consists essentially of randomly interesterified sunflower oil containing at least 60% linoleic acid.

It is known that the linoleic acid content of sunflower oil varies widely from as low as about 20% to 75% and above. The sunflower oil employed in the hydrogenated stock can advantageously be of the lower initial linoleic acid content. The content of the saturated fatty acid does not vary greatly. On the other hand, to achieve the overall 32% minimum for the linoleic acid content, at least a portion of the oil, particularly that employed in the non-interesterified portion, should have a linoleic acid content of at least about 65%. It is presently thought to be preferable to employ a sunflower oil having a 70% linoleic acid content in the non-interesterified portion.

The first portion of the oil phase, which contains hydrogenated sunflower oil and can optionally include up to 70% liquid sunflower oil, is interesterified in a manner which is effective to randomize the arrangement of the fatty acid moieties among and within the triglycerides to inhibit the formation of stabilized, hard crystal structures which produce a gritty or sandy sensation in the mouth upon consumption of the final margarine product. Reaction conditions should be selected to achieve this end. Typically, as discussed in Bailey's Industrial Oil and Fat Products referred to above, a suitable alkali metal catalyst such as sodium or potassium in the form of the metal, a methylate or ethylate, or the like will be employed. Preferably, the catalyst will comprise sodium methylate. The first fat portion is heated in the presence of catalyst for a period of time and at a temperature effective to complete the randomization. Typically this will take from about 15 minutes to about one hour with the temperature being at least sufficient to maintain all of the fat portion in the liquid form up to about 160° C. Typically, the temperature will be within the range of from about 100° to 125° C. The reaction will preferably be conducted under a vacuum. The reaction mixture is then washed bleached, dried and filtered as desired to obtain a suitable fat for food use.

The first oil portion is then blended with a second oil portion to form the oil phase. The second oil portion comprises from 60 to 100% liquid sunflower oil which will have a linoleic acid content of at least 65%, and preferably at least 70%. The second oil portion can also contain up to about 40% hydrogenated sunflower oil based on the weight of this portion. The fats are preferably blended in a liquid state to obtain the most homogeneous blend. The first oil portion will comprise from 30 to 75% of the weight of the oil phase, and the second oil portion will comprise from 25 to 70% of the weight of the oil phase. Where the separate oil phases have not been deodorized, it is necessary to deodorize the combined oil phase. The combined oil phase will contain, based on the combined weight of all components of the phase, less than 21% total of palmitic and stearic acids, and at least 32, preferably greater than 37% up to 55%, linoleic acid. Where a third portion consisting essentially of randomly interesterified sunflower oil is to be employed, it is prepared and blended as described above.

To prepare a margarine, separate oil phases and water phases are prepared and then blended and emulsified together. The oil phase will contain, in addition to the first and second oil portions described above, all other fat soluble components such as color, flavor and vitamins, emulsifiers, and anti-spatter or crystal modifying agents. Typical emulsifiers will be mono- and di-glycerides and/or lecithin. Lecithin is also a typical anti-spattering additive, and examples of coloring agents are beta-carotene, annatto, turmeric, paprika and FD&C dyes. Representative of the flavors will be lipolyzed butter oils, diacetyl, 2-octanone, butyric acid, hexanoic acid, and the like. The water phase may contain water soluble flavors, and other water soluble and dispersible materials such as milk solids, whey solids, preservatives, salt, casein, caseinates, albumin and other suitable margarine ingredients.

The oil phase is maintained at a temperature effective to maintain all of the components of it in a liquid state prior to blending with water which is typically at a temperature effective to bring the combined mixture to a level suitable for emulsification. The emulsion may be formed in conventional in-line or tank-type emulsifiers as known to the art. After emulsification, the emulsion is pumped through a series of cooling, scraped-surface heat exchangers to promote proper crystallization during cooling. A resting or working "B" unit is typically employed before the last heat exchanger to promote crystallization. For each 80 parts by weight of oil phase, between 5 and 20 parts by weight of aqueous phase will be employed.

The following examples are presented for the purpose of further illustrating and explaining the present invention and are not to be taken as limiting in any regard. Unless otherwise indicated, all parts and percentages are by weight.

EXAMPLE 1

According to this example, a tub-type sunflower oil margarine with about 48% linoleic acid is prepared. The oil phase comprises a blend of 37% by weight of an interesterified hydrogenated sunflower oil, with 63% liquid sunflower oil from the same lot. The starting sunflower oil has a linoleic acid content of about 68%. The hydrogenated sunflower oil is prepared by hydrogenation at 350° F. employing 0.2% of a sulfur poisoned nickel catalyst by weight of the oil, 0.2% Filter Aid finely divided silicates, and a hydrogen pressure of 50 psig while stirring at 700 rpm. The hydrogen is added for a total of 140 minutes to achieve iodine value (IV) of 82. This hydrogenated sunflower oil is then interesterified at 110° C. under a vacuum of 5 mm of mercury using 0.2% sodium methylate as a catalyst. The reaction mixture is stirred while heating for 30 minutes. The interesterified sunflower oil is then washed, bleached, dried, and filtered. This interesterified portion is then blended with the liquid sunflower oil to obtain an oil phase which shows a solid fat content at 50° F. of 11.8%, a solid fat content of 4.3% at 70° F. and only 0.1% at 92°. The following other ingredients are blended with the oil phase:

| Ingredient | Weight % of Oil Phase |
|---|---|
| Emulsifier, mono- and di-glicerdies (40% mono-) | 0.25 |
| Lecithin | 0.21 |
| Beta-carotene, vitamins, minerals & colors | 0.01 |

An aqueous phase is prepared from the following ingredients:

| Ingredient | Weight % of Aqueous Phase |
|---|---|
| Sodium Chloride | 10 |
| Whey Solids | 8 |
| Sodium Benzoate | 0.5 |

The oil phase is blended uniformly at a temperature of about 125° F., while the aqueous phase is blended at room temperature. The aqueous phase is then pasteurized and cooled to 50° F. The margarine composition is prepared by blending 80 parts by weight of the oil phase with 20 parts by weight of the aqueous phase, and then emulsified at 120° F. The emulsion is then passed through two cooling votator scraped-surface heat exchanges ("A" units) to an in-line mixer (working "B" unit), and then to a third "A" unit. The resulting emulsion is then pumped to the filling apparatus.

EXAMPLE 2

According to this example, another tub-type sunflower oil margarine is prepared according to the basic procedures of Example 1; however, this time the oil phase comprises 40% of an interesterified blend of equal parts of hydrogenated and unhydrogenated sunflower oil, and 60% of a non-interesterified liquid sunflower oil. Also, the hydrogenated oil has an iodine value of 72. The oil phase prepared according to this example has 8.4% solids at 50° F., 3.3% solids at 70° F., and 0.1% solids at 92° F.

EXAMPLE 3

Another tub-type sunflower oil margarine product is prepared in general accordance with the procedures set forth in Example 2 except that this time the non-interesterified portion of the oil phase contains 10% hydrogenated sunflower oil (IV 72). The SFI profile for this oil phase shows 8.3% solids at 50° F., 3.7% solids at 70° F. and 0.2% solids at 92° F.

EXAMPLE 4

Another tub-type margarine product is prepared in general accordance with the procedures set forth in Example 3, except that this time the non-interesterified portion comprises 50% liquid oil and 20% hydrogenated oil, and the interesterified portion comprises only 30%, all liquid percentage based on the weight of the oil phase. The SFI profile for this oil phase shows 12.2% solids at 50° F., 6.6% solids at 70° F., and 0.6% solids at 92° F.

The above description is for the purpose of teaching the person skilled in the art how to practice the present invention. This description is not intended to detail all of the obvious modifications and variations of the invention which will become apparent upon reading. However, applicants do intend to include all such obvious modifications and variations within the scope of their invention which is defined by the following claims.

What is claimed is:

1. A sunflower-oil-based edible fat product which exhibits an SFI profile within the following ranges
   50° F. >8%
   70° F. >3%
   92° F. <4%
and which comprises a blend of: (a) from 30 to 75% by weight of the fat product of a randomly interesterified first portion comprising from 30 to 100% hydrogenated sunflower oil and from 0 to 70% liquid sunflower oil, both based on the weight of the first portion; and (b) from 25 to 70% by weight of the fat product of a second portion comprising from 60 to 100% liquid sunflower oil containing at least 65% by weight linoleic acid, and up to 40% hydrogenated sunflower oil based on the weight of the portion; wherein the fat product contains, based on its combined weight, less than 21% total of palmitic and stearic acids, and from 32 to 55% linoleic acid.

2. A sunflower oil margarine comprising an aqueous phase and an oil phase which consists essentially of the edible fat blend according to claim 1.

3. A sunflower-oil margarine according to claim 2, wherein the hydrogenated sunflower oil in said first portion has an iodine value of less than 85.

4. A sunflower oil margarine according to claim 2 wherein the oil phase contains at least 40% linoleic acid based on the weight of the oil phase.

5. A sunflower oil margarine according to claim 4 which exhibits a penetrometer reading of from 100 to 250.

6. A sunflower oil margarine according to claim 5 wherein the SFI profile is within the following ranges:
   50° F.—9 to 15
   70° F.—5 to 10
   92° F.—3.5 maximum 7. A sunflower oil margarine according to claim 2 which exhibits a penetrometer reading of from 50 to 150.

8. A sunflower oil margarine according to claim 7 wherein the oil phase exhibits an SFI profile within the following ranges:
50° F. >15%
70° F. >7%
92° F. <4%

9. A sunflower oil margarine according to claim 8 wherein the SFI profile is within the following ranges:
50° F.—16 to 31
70° F.—11 to 18
92° F.—3.5 maximum 10. A sunflower oil margarine according to claim 9 wherein the SFI value at 80° F. is within the range of from about 8 to about 10.

11. An edible product according to claim 1 which comprises a third portion consisting essentially of a randomly interesterified sunflower oil containing at least 60% linoleic acid.

12. A sunflower oil margarine comprises an aqueous phase and an oil phase which consists essentially of the edible fat product according to claim 11.

13. A process for preparing a sunflower oil margarine which comprises: (a) blending 80 parts by weight of an oil phase consisting essentially of a fat product as defined in either of claims 1 or 11 with up to 20 parts by weight of an aqueous phase; and (b) emulsifying the oil and aqueous phases to form a water-in-oil emulsion.

* * * * *